Sept. 28, 1965 P. C. GUNN 3,208,794
COVER FOR AIRCRAFT SEAT
Filed Aug. 31, 1964
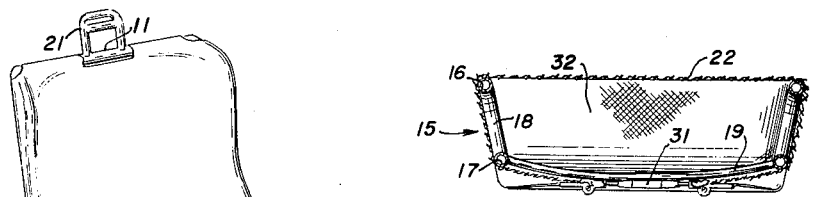
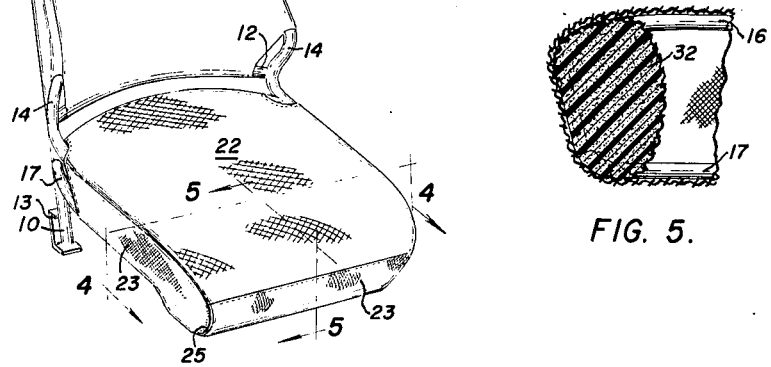
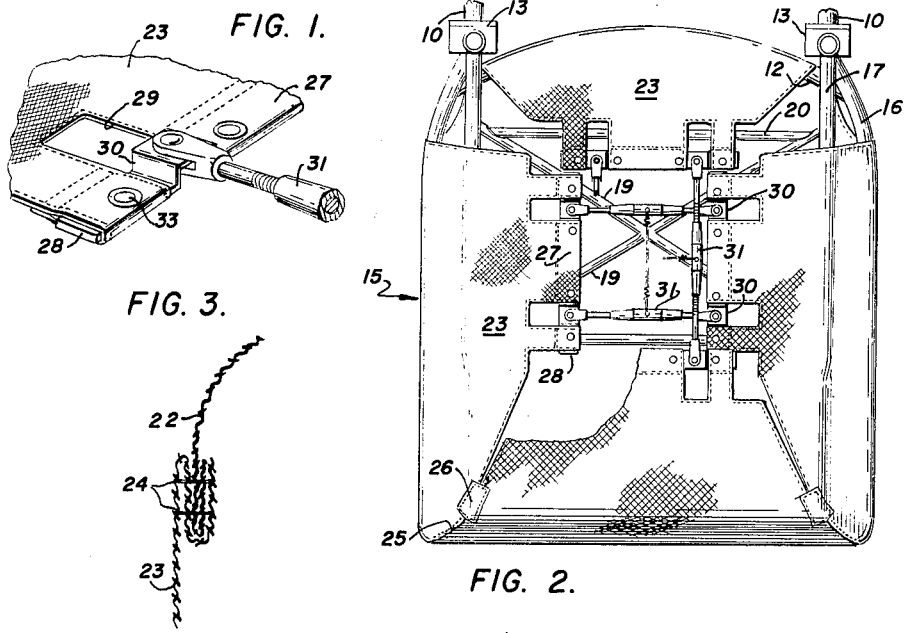
PAUL C. GUNN
INVENTOR.
BY *Herbert J. Brown*
ATTORNEY

United States Patent Office 3,208,794
Patented Sept. 28, 1965

3,208,794
COVER FOR AIRCRAFT SEAT
Paul C. Gunn, Fort Worth, Tex., assignor to Air Laboratory Service Co., Inc., Fort Worth, Tex., a corporation of Texas
Filed Aug. 31, 1964, Ser. No. 393,274
3 Claims. (Cl. 297—219)

This invention relates to chairs, generally, and has reference to seats for aircraft.

Saving weight without unduly sacrificing strength is always a prime object in aircraft design, not only in the aircraft structure, but in the installed equipment as well. An object of the present invention is to provide a seat, such as a pilot's seat, which is of light weight, yet sufficiently strong for its intended purpose.

A particular object of the invention is to provide a stretched cover over the seat portion of a frame and thereby eliminate heavy cushions and springs, and at the same time provide comfortable adequate support for the person sitting on the seat.

Another object of the invention is to provide convenient means for taking up or restretching the seat cover after it sags due to extended use.

A further object is to provide a cover and support for the described purpose wherein the seat area is of open mesh net for free circulation of air, and wherein the other areas of the cover are of close knit fabric for appearance.

Another object of the invention is to provide a turnbuckle arrangement for easily applying the cover to a frame, and which arrangement includes offsets in the tension applying bars whereby crossed turnbuckles do not interfere with each other.

These and other objects of the invention will become apparent from the following description and the accompanying drawing, wherein:

FIGURE 1 is a perspective view of an aircraft seat including a seat cover and body support according to the invention.

FIGURE 2 is an enlarged bottom plan view of the aircraft seat shown in FIGURE 1.

FIGURE 3 is a further enlarged fragmentary perspective view of a portion of bottom of the seat cover and showing the attachment of a turnbuckle to a tension bar for stretching the cover.

FIGURE 4 is a sectional view taken on lines 4—4 of FIGURE 1.

FIGURE 5 is an enlarged fragmentary sectional view taken on lines 5—5 of FIGURE 1, and FIGURE 6 is an enlarged schematic view similar to a sectional view, showing preferred means securing the net of the seat area to fabric of the front, back, side and bottom areas.

The aircraft seat shown includes a tubular frame having generally vertical side members 10, upper and lower cross members 11 and 12 therebetween, mounting brackets 13 on the lower ends of the vertical members, side rails 14 connected with the upper ends of the side members and generally parallel therewith, the lower ends of which side rails project forwardly and thence reversely to provide a seat frame, generally indicated by the numeral 15. As best shown in FIGURE 4, the frame 15 consists of upper and lower horizontal seat rails 16 and 17 which are arcuately joined at their forward ends by bends 18. The lower seat rails 17 are braced in parallel relation by diagonal cross braces 19 which arcuately depend beneath the rails to which they are connected and a single cross member 20 at the rear of the frame and connected with said diagonal braces. The upwardly projecting inverted U-shaped member 21 on the upper cross member 11 is a guide for shoulder straps.

The cover and body support comprising the present invention includes a seat area 22 of open mesh nylon net or the like, and front side and rear flaps 23 of strong fabric are connected therearound by stitches 24 as illustrated in FIGURE 6. The adjoining edges of the front and side flaps 23 are sewn together at 25 where the same engage the reverse bends 18 of the frame. Reinforcing patches 26 may be provided at the bottom of the last referred to stitching as shown in FIGURE 2.

The flaps 23 extend downwardly and beneath the front, back and sides of the seat frame 15 where opposing edges of the flaps are parallel but spaced from each other. Each flap edge is hemmed to provide a casing 27 for receiving a tension bar 28 therein. The casings 27 and adjoining flaps 23 are notched at 29 in at least two places where there are offsets 30 in the tension bars 28. The offsets 30 in opposing pairs of bars 28 are in the same direction, that is, up or down, whereas the offsets in the remaining bars are in the opposite direction.

As best shown in FIGURE 2, pairs of turnbuckles 31 are connected with parallel tension bars 28 at their offsets 30. This construction and arrangement not only makes for easy installation and adjustment for tightening the cover, it also provides means for taking up slack after the cover stretches. It is to be noted that the tension bars 28 may be rotated one-half turn at a time, and yet the offsets in the bars will fall within the notches 29. The turnbuckles 31 are readily accessible beneath the seat frame 15, particularly in view of the described upper and lower seat rails 16 and 17 which are raised from the floor. Grommets 33 are provided through the casings 27 and tension bars 28 to prevent rotation of said bars in said casings. Thus, when the slack in the cover 22 is taken up, there is no possibility of the bars 28 turning within the casings 27. With particular reference to FIGURE 5, the preferred construction between the stitching 25 at the front corners of the cover includes a transverse leg support 32 of resilient material, such as sponge rubber.

The invention is not limited to the exemplary construction herein shown and described, but may be made in various ways within the scope of the appended claims.

What is claimed is:

1. In combination with a seat having a pair of spaced vertical side members and a seat frame projecting forwardly from each said side member and spacer means between the lower said seat rails, a seat cover and body support of flexible sheet material having front, side and back edges, flaps connected with said edges and adapted to fit around and beneath corresponding parts of said seat frame, opposite edges of said flaps being substantially parallel with each other and having hemmed casings therein, flat elongate tension bars received with said casings, turnbuckles connecting parallel said tension bars and notches in said casings and flaps where said turnbuckles connect with said tension bars whereby said bars may be rotated when said turnbuckles are disconnected and whereby said turnbuckles may be reconnected to said bars after the same have been turned, offsets in said tension bars where they connect with said turnbuckles, the offsets in one parallel pair of said tension bars being opposite to the offsets of the remaining pair of said tension bars whereby crossing said tension bars do not interfere with each other.

2. The construction defined in claim 1 and including a transverse leg support of resilient material entirely between the front ends of said seat rails.

3. The construction defined in claim 1 and means securing said tension bars in their respective casings so as to prevent turning therein.

(References on following page)

References Cited by the Examiner

UNITED STATES PATENTS

| | | | |
|---|---|---|---|
| 404,722 | 6/89 | Moore | 5—220 |
| 692,705 | 2/02 | Plettenberg | 5—187 |
| 1,583,300 | 5/26 | McTernan | 5—187 |
| 2,589,901 | 3/52 | VanDoren | 297—218 |
| 3,066,435 | 12/62 | Oddo | 297—229 |
| 3,088,773 | 5/63 | Horrocks | 297—445 |
| 3,120,407 | 2/64 | Propst | 297—457 |

FOREIGN PATENTS

| | | |
|---|---|---|
| 521,742 | 3/31 | Germany. |

FRANK B. SHERRY, *Primary Examiner.*